(12) United States Patent
Roth et al.

(10) Patent No.: US 6,277,896 B1
(45) Date of Patent: Aug. 21, 2001

(54) METHOD FOR MANUFACTURING A MONOLITHIC PLASTIC OBJECT, AND AN OBJECT OBTAINED WITH THIS METHOD

(75) Inventors: Cornelis Willem Roth, Enschede; Johan Boshuis, Hengelo; Franciscus Egbertus Richters, Oldenzaal; Andreas Bernardus Eidhof, Enschede; Christiaan Antonius Jagers, Hengelo; René de Jong, Enschede, all of (NL)

(73) Assignee: Corell Resin Technology B.V. (NL)

( * ) Notice: Subject to any disclaimer, the term of this patent is extended or adjusted under 35 U.S.C. 154(b) by 0 days.

(21) Appl. No.: 09/308,427

(22) PCT Filed: Nov. 20, 1997

(86) PCT No.: PCT/NL97/00637
    § 371 Date: Aug. 17, 1999
    § 102(e) Date: Aug. 17, 1999

(87) PCT Pub. No.: WO98/22272
    PCT Pub. Date: May 28, 1998

(30) Foreign Application Priority Data

Nov. 20, 1996 (NL) .................................................. 1004572

(51) Int. Cl.⁷ ........................... B29C 44/06; B29C 44/10
(52) U.S. Cl. .................... 521/51; 264/45.3; 264/45.5; 264/50; 264/53; 264/54; 264/510; 521/134; 521/143; 522/157
(58) Field of Search ................... 264/500, 45.5, 264/45.3, 50, 53, 54, 510; 521/143, 134, 51; 522/157

(56) References Cited

U.S. PATENT DOCUMENTS

| | | | |
|---|---|---|---|
| 4,096,218 | 6/1978 | Yasuike et al. | 264/45.5 |
| 4,133,858 | 1/1979 | Hayakawa et al. | 264/54 |
| 5,116,881 * | 5/1992 | Park et al. | 521/143 |
| 5,149,579 * | 9/1992 | Park et al. | 428/213 |
| 5,180,751 * | 1/1993 | Park et al. | 521/51 |
| 5,567,742 * | 10/1996 | Park | 521/143 |

FOREIGN PATENT DOCUMENTS

| | | | |
|---|---|---|---|
| 2251937 * | 5/1973 | (DE) | 264/45.5 |
| 2551038 * | 5/1976 | (DE) | 264/45.5 |
| 2758924 * | 7/1978 | (DE) | 264/45.5 |
| 0 190 021 * | 8/1986 | (EP) | 521/134 |
| 0450342 A2 | 10/1991 | (EP) . | |
| 0 481 306 * | 4/1992 | (EP) | 264/45.5 |
| 0692358 A1 | 1/1996 | (EP) . | |
| 44-2574 * | 2/1969 | (JP) | 521/143 |
| 58-171924 * | 10/1983 | (JP) | 264/45.5 |
| 61-176636 * | 8/1986 | (JP) | 521/134 |
| 62-212123 * | 9/1987 | (JP) | 264/45.5 |
| 63-162214 * | 7/1988 | (JP) | 264/45.5 |
| 4-144721 * | 5/1992 | (JP) | 264/45.5 |

OTHER PUBLICATIONS

Database WPI, Week 9306, Accession No. 93–049320, Abstract of JP 5000429, Jan. 8, 1993, 1 page.

* cited by examiner

Primary Examiner—Allan R. Kuhns
(74) Attorney, Agent, or Firm—Webb Ziesenheim Logsdon Orkin & Hanson, P.C.

(57) ABSTRACT

A method for manufacturing a plastic object may include the steps of: (a) providing an injection moulding device with a mould that includes two mould parts which in a closed position define a mould cavity; (b) providing foaming means for causing foaming in the mould cavity of plastic injected into the mould cavity; (c) providing blocking means for temporarily rendering the foaming means effectively inactive; (d) energizing the blocking means; (e) choosing as plastic a mixture of two plastics, wherein the first plastic is a non-type A plastic and the second plastic is a type A plastic that constitutes a maximum of roughly 30 percent by mass of the mixture, wherein the type A plastic is a plastic with high melt strength compatible with the first plastic, for instance HMS PP which is high-melt-strength polypropylene; (f) causing a formed object to cool to a chosen temperature, opening the mould cavity and removing the cooled object.

20 Claims, No Drawings

METHOD FOR MANUFACTURING A MONOLITHIC PLASTIC OBJECT, AND AN OBJECT OBTAINED WITH THIS METHOD

BACKGROUND OF THE INVENTION

1. Field of the Invention

The invention relates to a method for manufacturing a monolithic plastic object which is constructed as structural foam and define a sandwich-like structure with a foam core and closed skin.

2. Description of the Prior Art

Such a method and board obtained therewith is known for instance from U.S. Pat. No. 4,096,218.

Known from the '219 patent is a method according to which a few seconds after completion of injection of the plastic the mould cavity is enlarged in a predetermined time and in a controlled manner. By making use of a foaming agent and application of gas counter pressure, it can thus be achieved that the foam structure is of good quality, while the skin of the obtained board has a closed and smooth structure.

According to the said '218 patent, the mould is held for a predetermined time in its closed starting position, whereafter the mould undergoes a determined expansion in a subsequent specified period. After reaching maximum expansion cooling takes place for a time, whereafter the formed board can be removed.

Attention is also drawn to U.S. Pat. No. 4,133,858, which deals with a related technique and wherein mention is also made of a number of possible plastics for use in the context of this technique and substances such as foaming agents for adding thereto.

Applicant's own European patent application EP-A-0 692 358 relates to a further development of the technique as described in the above stated two references. According to this patent application, opening of the mould takes place in a very well defined and controlled manner, whereby in principle a plastic board of good quality can be obtained. The drawback of this technique however is that the various parameters involved must be controlled within very narrow limits, which cannot always be realized in practice or does not result in an optimum product or process.

Since it has been found that with the known method boards of a sufficiently high and constant quality cannot be obtained, it is an object of the invention to provide a method with which an object, for instance a board, of improved quality can be manufactured.

It has been found that with the prior art method there is only a very limited freedom to vary the relevant parameters in order to obtain objects with different compositions and dimensions. As a result it cannot always be prevented that, where there is insufficient control or freedom of a relevant parameter, the obtained product does not comply with the required quality standards.

It is therefore an object of the invention to increase the freedom of choice and the tolerance limits of the various relevant parameters.

It is a further object of the invention to make the skin thickness better controllable and even practically fully controllable.

Yet another object of the invention is to shorten a production cycle.

Finally, it is an object of the invention to make the foam density distribution considerably better controllable than is the case with the prior art.

SUMMARY OF THE INVENTION

In respect of the above, the present invention provides a method for manufacturing a monolithic plastic object, for instance a board, which object defines a sandwich-like structure with a foam core and closed skin, and wherein the method may comprise the following steps of:

(1) providing an injection moulding device with a plastic plasticizing and injection device and a mould which includes at least two mould parts displaceable relative to each other by displacing means, which mould parts in a closed first extreme position define a mould cavity connecting onto the plasticizing and injection unit and in an open second extreme position release a formed object for removal, wherein the displacing means are adapted to move the mould parts at a chosen speed;

(2) providing foaming means for causing foaming in the mould cavity of plastic injected into the mould cavity;

(3) providing gas feed means for feeding gas under pressure to the mould cavity to temporarily render the foaming means effectively inactive;

(4) energizing the feed means;

(5) energizing the plasticizing and injection unit in the first extreme position of the mould in order to inject heated plastic into the mould cavity, which plastic is a mixture of two plastics, wherein first plastic is a random plastic or mixture of plastics, and, in particular, a non-type A plastic, and wherein the second plastic is type A that constitutes a maximum of 20 percent by mass of the mixture, wherein the type A plastic is a plastic with high melt strength compatible with the first plastic, for instance HMS PP which is high-melt-strength polypropylene, that is obtained by subjecting polypropylene to one of electron bombardment, electron beams, chemical modification and direct polymerization;

(6) ending the energizing of the gas feed means;

(7) ending the energizing of the plasticizing and injection unit;

(8) energizing the displacing means such that the mould parts move apart in accordance with a chosen velocity progression; and (9) causing the thus formed object to cool to a chosen temperature, fully opening the mould cavity and removing the cooled object.

DETAILED DESCRIPTION OF THE PREFERRED EMBODIMENTS

By making the foam density distribution and the skin thickness adjustable according to the present invention, mechanical parameters have become adjustable and controllable. This relates for instance to the stiffness modulus, which is adjustable in a substantial range, in addition to the suitability of the material to accommodate elements with screw threads. This relates on the one hand to the adhesion and on the other to the pull-out force.

Use of the invention creates the possibility of applying very small initial wall thicknesses, for instance 3–6 mm instead of the wall thickness of for instance 6–10 mm, which is described among others in applicant's said patent application EP-A-0 692 358, which is incorporated herein by reference.

In addition, production of objects with greater wall thicknesses can be easily realized in an economic manner according to the present invention.

Tests have shown that with the invention a cycle time is possible with a reduction of more than 30% of the total cooling time.

The present invention utilizes so-called gas counter pressure with which foaming of the injected plastic in the mould cavity can be temporarily discontinued.

The present invention relates to specific application of a second plastic of a described type A consisting of a material with high melt strength, for instance polypropylene, which has been subjected to an electron bombardment whereby a change in the material has occurred so that a per se known HMS PP is obtained, which is a high-melt-strength polypropylene. Such a material can be compared to "chewing gum". It is a material which displays a strengthening behaviour when the melt is extended or stretched uni-axially or biaxially. Stabilizing occurs due to the strong increase in the stretch viscosity of thin, extending parts of the melt. The material has been per se known for a number of years and is applied as bulk material in extruder foams. Examples of such materials are PF633 manufactured by Montell Polyolefins, which has an MFI (Melt Flow Index) of 5.5 grams per 10 minutes at a temperature of 230■C, 2.16 kg. Another material is PF814 from the same manufacturer. This material is recommended by the manufacturer for use in foam products of low density. It has an MFI of 3.0 grams per 10 minutes at a temperature of 230■C, 2.16 kg.

In addition to the above mentioned high-melt-strength polypropylene, other suitable materials with high melt strength can also be used. This relates to materials with High Melt Strength behaviour. The additive is compatible with the bulk polymer(s) and is characterized by the occurrence of a relevant increase in the stretch viscosity during uni-axial or biaxial stretching of the melt. The increase in stretch viscosity at low constant shear rate ($<5$ $s^{-1}$) is much larger (30% or more) in the time during the stretching than the increase in stretch viscosity of the base polymer(s).

For a definition of stretch viscosity (German: Dehnungsviskosität) reference can be made to the literature, for instance Munstedt, H. J., Reology (1979) 23, p.421). For measurements on HMS, reference can be made to E. M. Philips et al: Polypropylen mit hoher Schmelzstabilität, Kunststoffe 82, 1992.

With respect to the manner in which for instance HMS PP, can be obtained, it is noted that different options exist for this purpose. PP can for instance be subjected to an electron bombardment. Alternatively, chemical modification or direct polymerization of polypropylene can be envisaged.

Several materials which are considered suitable the first plastic including polyolefin, vinyl polymer or styrene, for instance, LDPE, HDPE, PP, EVA, PVC, PS, ABS, PPO, as will be appreciated by those skilled in the art. Addition of a polyolefin or a mixture of polyolefins is at this moment being envisaged for use of HMS PP.

As stated above, the invention in its general form relates to the addition of plastic type A up to a total in the mixture of a maximum of roughly 30 percent by mass. When a larger quantity is used, a drawback is encountered that the price of the plastic objects obtained becomes unacceptably high because HMS PP for instance, is a relatively expensive raw material. It has further been found that above the stated limit of about 30 percent by mass, the activity of HMS PP decreases.

The method preferably has the special feature that a maximum of about 30 percent by mass of type A is present in the mixture.

A preferred embodiment of the method has the feature that about 4–6 percent by mass of type A is present in the mixture. At values below the range specified hereinabove, the influence of HMS PP is found to be too limited to be deemed useful technically and economically.

The invention further relates to a monolithic plastic object obtained by the above-described method.

During the manufacture, such an object can also be formed integrally in a per se known manner with a (decorative) foil, a cloth or other cover material.

The invention also relates to the use of a plastic with high melt strength, for instance HMS PP (high-melt-strength polypropylene obtained by subjecting polypropylene to an electron bombardment or electron beams, to chemical modification or direct polymerization) as a component in a plastic mixture with a proportion of a maximum of 30 percent by mass, in accordance with the above described methods.

What is claimed is:

1. A method for manufacturing a monolithic plastic object, which object defines a sandwich-like structure with a foam core and closed skin, and wherein the method comprises the steps of:

(1) providing an injection moulding device with a plastic plasticizing and injection device and a mould which includes at least two mould parts displaceable relative to each other by displacing means, which mould parts in a closed first extreme position define a mould device and in an open second extreme position release a formed object for removal, wherein the displacing means are adapted to move the mould parts at a chosen speed;

(2) providing foaming means for causing foaming in the mould cavity of plastic injected into the mould cavity;

(3) providing gas feed means for feeding gas under pressure to the mould cavity to temporarily render the foaming means effectively inactive;

(4) energizing the gas feed means;

(5) energizing the plasticizing and injection unit in the first extreme position of the mould in order to inject heated plastic into the mould cavity, which plastic is a mixture of two plastics, wherein the first plastic is a non-type A plastic and the second plastic is a type A plastic that constitutes a maximum of 20 percent by mass of the mixture, and wherein the type A plastic is a plastic with high melt strength compatible with the first plastic;

(6) ending the energizing of the gas feed means;

(7) ending the energizing of the plasticizing and injection unit;

(8) energizing the displacing means such that the mould parts move apart in accordance with a chosen velocity progression; and (9) causing the formed object to cool to a chosen temperature, fully opening the mould cavity and removing the cooled and formed object.

2. The method as claimed in claim 1, wherein a maximum of 10 percent by mass of the type A plastic is present in the mixture.

3. The method as claimed in claim 2, wherein between 3 and 7 percent by mass of the type A plastic is present in the mixture.

4. The method as claimed in claim 1, wherein the plastic is thermoplastic.

5. The method as claimed in claim 1, wherein the plastic contains at least one polymer.

6. The method as claimed in claim 1, wherein the plastic contains one of polyolefin, vinyl polymer and styrene.

7. The method as claimed in claim 1, wherein the plastic contains a homopolymer.

8. The method as claimed in claim 1, wherein the plastic contains a copolymer.

9. The method as claimed in claim 1, wherein to the plastic is added a filler, an additive, a stabilizer, and a colouring agent.

10. The method as claimed in claim 1, wherein to the plastic is added at least one of a chemical foaming agent and a physical foaming agent.

11. The method as claimed in claim 1, wherein the mould cavity defines a form such that the formed object is a board having a polygonal shape.

12. The method as claimed in claim 1, wherein the formed object is a board having a peripheral edge zone with a bent edge.

13. The method as claimed in claim 1, wherein prior to injection of plasticized plastic into the mould cavity, gas is admitted under pressure into the mould cavity.

14. A monolithic plastic object made by the method of claim 1.

15. The method as claimed in claim 1, wherein the type A plastic is high-melt-strength polypropylene (HMS PP) that is obtained by subjecting polypropylene to one of electron bombardment, electron beam, chemical modification and direct polymerization.

16. The method as claimed in claim 3, wherein between 4 and 6 percent by mass of the type A plastic is present in the mixture.

17. The method as claimed in claim 1, wherein the plastic is selected from the group consisting of LDPE, HDPE, PP, EVA, PVC, PS, ABS and PPO.

18. The method as claimed in claim 9, wherein the filler is selected from the group consisting of limestone, talcum and glass fibres, and wherein the additive is selected from the group consisting of $TiO_2$, $BaSO_3$, and $BaSO_4$.

19. The method as claimed in claim 10, wherein the chemical foaming agent is selected from the group consisting of hydrocerol LC, hydrocerol compound, 5-phenyltetrazole, azodicarbonamide, $NaHCO_3$, $(NH_4)_2CO_3$, $(NH_4)HCO_3$, sulphohydrazides, triazine compounds and toluene-sulphosemicarbazide and wherein the physical foaming agent is selected from the group consisting of $N_2$, $H_2O$, and isobutane.

20. The method as claimed in claim 13, wherein the gas is one of nitrogen and air.

* * * * *

UNITED STATES PATENT AND TRADEMARK OFFICE
CERTIFICATE OF CORRECTION

PATENT NO. : 6,277,896 B1
DATED : August 21, 2001
INVENTOR(S) : Cornelis Willem Roth et al.

It is certified that error appears in the above-identified patent and that said Letters Patent is hereby corrected as shown below:

Column 1,
Line 15, "the '219 patent" should read -- the '218 patent --.
Line 22, after "According to the" delete "said".

Column 2,
Line 29, "type A that constitutes" should read -- type A plastic that constitutes --.
Line 44, "the thus formed" should read -- the formed --.

Column 3,
Line 47, "suitable the" should read -- suitable as the --.

Signed and Sealed this

Twenty-sixth Day of February, 2002

JAMES E. ROGAN
*Director of the United States Patent and Trademark Office*

*Attest:*

*Attesting Officer*